US010257086B2

(12) United States Patent
Black et al.

(10) Patent No.: US 10,257,086 B2
(45) Date of Patent: *Apr. 9, 2019

(54) SOURCE IMPOSITION OF NETWORK ROUTES IN COMPUTING NETWORKS

(71) Applicant: Microsoft Technology Licensing, LLC, Redmond, WA (US)

(72) Inventors: Benjamin Black, Seattle, WA (US); Dawn Cseh, Woodinville, WA (US); Tim LaBerge, Sammamish, WA (US); Edet Nkposong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/926,626

(22) Filed: Mar. 20, 2018

(65) Prior Publication Data

US 2018/0212871 A1 Jul. 26, 2018

Related U.S. Application Data

(63) Continuation of application No. 14/851,361, filed on Sep. 11, 2015, now Pat. No. 9,954,772.
(Continued)

(51) Int. Cl.
*H04L 12/723* (2013.01)
*H04L 12/741* (2013.01)
(Continued)

(52) U.S. Cl.
CPC .......... *H04L 45/50* (2013.01); *H04L 12/4633* (2013.01); *H04L 45/02* (2013.01);
(Continued)

(58) Field of Classification Search
CPC ....... H04L 45/50; H04L 45/04; H04L 45/507; H04L 12/4633; H04L 45/38; H04L 45/34; H04L 45/745; H04L 45/64; H04L 45/02
See application file for complete search history.

(56) References Cited

U.S. PATENT DOCUMENTS

2014/0098675 A1* 4/2014 Frost .................... H04L 69/166
370/241.1
2016/0127225 A1* 5/2016 Cai ........................ H04L 45/04
370/392

(Continued)

OTHER PUBLICATIONS

Cai et al., Evolve Carrier Ethernet Architecture with SDN and Segment Routing, Proceeding of IEEE International Symposium on a World of Wireless, Mobile and Multimedia Networks, Jun. 19, 2014 (Year: 2014).*

*Primary Examiner* — Shailendra Kumar
(74) *Attorney, Agent, or Firm* — Liang IP, PLLC

(57) ABSTRACT

Various techniques for source imposition of network routes are disclosed herein. In one embodiment, a method includes receiving label values at a source host from a label server. The individual label values corresponding to a network route to one of the hosts or network nodes in the computing network. The method also includes constructing a label stack to reach a destination virtual machine on a destination computing device in the computing network based on the received label values corresponding to the destination computing device and a location of the source computing device in the computing network. The method also includes imposing the constructed label stack on a packet destined to the destination virtual machine on the destination computing device.

20 Claims, 8 Drawing Sheets

Related U.S. Application Data

(60) Provisional application No. 62/185,039, filed on Jun. 26, 2015.

(51) Int. Cl.
  *H04L 12/715* (2013.01)
  *H04L 12/46* (2006.01)
  *H04L 12/721* (2013.01)
  *H04L 12/751* (2013.01)

(52) U.S. Cl.
  CPC .............. *H04L 45/04* (2013.01); *H04L 45/34* (2013.01); *H04L 45/38* (2013.01); *H04L 45/507* (2013.01); *H04L 45/64* (2013.01); *H04L 45/745* (2013.01)

(56) References Cited

U.S. PATENT DOCUMENTS

2016/0164826 A1\* 6/2016 Riedel ................. H04L 43/0876
  709/223
2016/0277290 A1\* 9/2016 Sivabalan ............... H04L 45/50

\* cited by examiner

SOURCE IMPOSITION OF NETWORK ROUTES IN COMPUTING NETWORKS

CROSS-REFERENCE TO RELATED APPLICATION(S)

This application is a continuation of U.S. patent application Ser. No. 14/851,361, filed Sep. 11, 2015, which is a non-provisional application of and claims priority to U.S. Provisional application No. 62/185,039, filed on Jun. 26, 2015.

BACKGROUND

Computing networks typically include routers, switches, bridges, or other network devices that interconnect a number of physical servers via wired or wireless network links. Each physical server can host one or more virtual machines or other types of virtualized components interconnected with one another via virtual networks. The virtual machines can exchange messages via the virtual networks in accordance with one or more network protocols supported by the physical network devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One difficulty associated with designing and operating computing networks is scalability. As numbers of virtual machines or physical servers increase, the amount of requisite resources as well as operational complexity rapidly increase. For example, routers, switches, and other network devices typically store network routes between pairs of virtual machines or physical servers in routing tables. However, as numbers of virtual machines or physical servers reach millions or even tens of millions, the network devices may have insufficient memory to store data describing network routes between all pairs of the virtual machines.

Several embodiments of the disclosed technology can improve scalability of computing networks by implementing discovery and imposition of network routes for messages at sources of the messages. For example, in certain embodiments, a source virtual machine hosted on a source server can transmit a packet to a destination virtual machine hosted on a destination server in a computing network. In preparation for the transmission, the source server (e.g., an operating system or hypervisor executing thereon) can request certain label values from an label server by transmitting a virtual network address of the destination virtual machine, associated virtual network identification, and a location of the source server. In response to the request, the label server provides a set of label values corresponding to network routes to the destination server. The source server can then construct a label stack (or other suitable data structure) having values corresponding to a select network route from the source server to the destination server. The source server can then impose the constructed label stack on the packet before transmitting the packet. Network devices of the computing network can then forward the packet to the destination server based on the imposed label stack. As such, the network devices can avoid storing a large amount of data describing network routes in the computing network. In other embodiments, the label server or other suitable computing devices in the computing network may construct the label stack instead of the source server. In further embodiments, a destination may be an external peer device, and a label stack may be similarly constructed and imposed to reach the external peer device.

DETAILED DESCRIPTION

Figure 1:
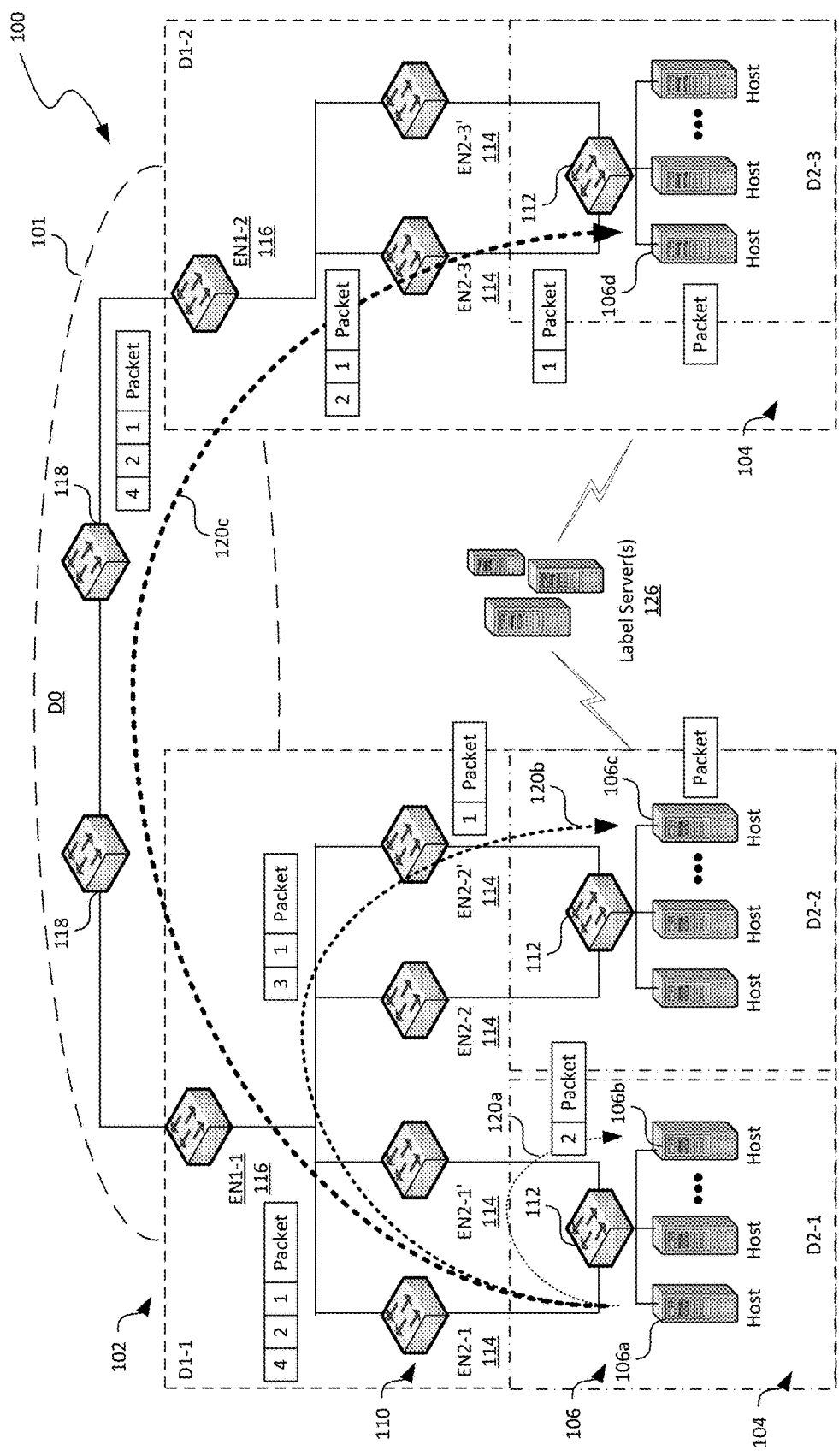
FIG. 1 is a schematic diagram illustrating a computing network having source imposition of network routes in accordance with embodiments of the disclosed technology.

Certain embodiments of systems, devices, components, modules, routines, data structures, and processes for construction and imposition of network routes in a computing network are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-9.

As used herein, the term "computing network" generally refers to an interconnected computer network having a plurality of network nodes that connect a plurality of hosts to one another or to external networks (e.g., the Internet). The term "network node" generally refers to a physical network device. Example network nodes include routers, switches, hubs, bridges, load balancers, security gateways, or firewalls. A "host" generally refers to a physical computing device configured to implement, for instance, one or more virtualized computing devices or components, or other suitable functionalities. For example, a host can include a server having a hypervisor configured to support one or more virtual machines. Each host or network node can be associated with an identifier. Example identifiers can include at least a portion of a label used in a multiple-protocol label switched ("MPLS") network, a stack of labels used in a MPLS network, or other suitable values.

A computing network can be conceptually divided into an overlay network implemented over an underlay network. An "overlay network" generally refers to an abstracted network implemented over and operating on top of an underlay network. The underlay network can include multiple physical network nodes interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can host one or more tenant end points ("TEPs"), for example, virtual machines. The virtual networks can interconnect multiple TEPs on different hosts. Virtual network nodes in the overlay network can be connected to one another by virtual links individually corresponding to one or more network routes along one or more physical network nodes in the underlay network.

The term "domain" or "segment" generally refers to a physical or logical partition of an underlay network. A domain can include a number of network nodes interconnected with one another and/or with a number of hosts in the underlay network. A domain can also be connected to one or more higher-level domains that include a number of additional network nodes that connect the particular domain to other domains at the same or different levels in a hierarchy of domains. In certain embodiments, a software defined network ("SDN") can be used to divide the underlay network into multiple domains. In other embodiments, one or more of the domains of the underlay network can be at least partially a distributed computing network that use distributed routing and/or forwarding protocols.

Computing networks such as those used in large-scale datacenters can be difficult to design and/or operate. As the numbers of physical servers increase, the amount of requisite resources or operational complexity can rapidly increase. For example, tracking IP addresses of a large number of started, relocated, or terminated virtual machines may require a large amount of resources at various network nodes of the computing network. Several embodiments of the disclosed technology can address at least some of the foregoing difficulties by implementing discovery and imposition of network routes at sources of communication sessions. As such, maintaining data describing network routes for hosts and/or virtual machines at the network nodes may be reduced, if not eliminated.

FIG. 1 is a schematic diagram illustrating a computing network 100 having source imposition of network routes in accordance with embodiments of the disclosed technology. As shown in FIG. 1, the computing network 100 can include an underlay network arranged into a plurality of domains or segments in a hierarchical manner. For example, a core domain 101 (identified as D0) interconnects two level-one domains 102 (identified individually as first level-one domain D1-1 and second level-one domain D1-2). Each level-one domain 102 can include one or more level-two domains 104. As shown in FIG. 1, the first level-one domain D1-1 includes two level-two domains 104 (identified individually as D2-1 and D2-2). The second level-one domain D1-2 includes one level-two domain 104 (identified as D2-3). The individual level-two domains 104 can include one or more host network nodes 112 interconnecting multiple hosts 106. In FIG. 1, three domain levels and particular numbers of domains at each level are shown for illustration purposes. In other embodiments, the computer network 100 may be partitioned into any suitable levels of domains with suitable numbers of domains and/or hosts at each level.

The hierarchical division shown in FIG. 1 can be applied to one or more datacenters in various manners. For example, in certain embodiments, the hierarchical division shown in FIG. 1 can be applied to one data center with the core domain 101 having one or more T3 broadband switches. The level-one domains 102 can include T2 switches connected to level-two domains 104 with T1 and/or top-of-rack ("TOR") switches. In other embodiments, the level-one domains 102 can include both T2 and T1 switches while the level-two domains 104 include TOR switches. In another example, the hierarchical division shown in FIG. 1 can be applied to multiple datacenters. For instance, the core domain 101 can include a core network interconnecting T3 broadband switches in multiple datacenters. Within each datacenter, the level-one domains 102 can each be associated with a datacenter that has T2 switches. The level-two domains 104 can be associated with a rack or multiple racks that include common T1 and/or TOR switches. In further examples, the division of the computer network 100 can include additional and/or different domain levels and/or arrangements.

In certain embodiments, the core domain 101 can include one or more core network nodes 118 interconnected to one another. Two core network nodes 118 are shown in FIG. 1 for illustration purposes. In other embodiments, the core domain 101 may include any suitable number of core network nodes 118 and/or other suitable components. The core network nodes 118 can include various computing and/or communications components to facilitate communications among lower-level domains. For example, the core network nodes 118 can include one or more label switched routers, long haul dense wavelength division multiplexing modules, dynamic context routers, interface message processors, and/or other suitable components.

As shown in FIG. 1, the level-one domains 102 can include one or more edge nodes 116 interconnected to the core domain 101 and the level-two domains 104. As used herein, an "edge node" generally refers to a network node between a lower-level domain and an interconnected higher-level domain. The edge node is both (1) a destination for the higher-level domain; and (2) an entry point for the lower-level domain, or vice versa. For example, the level-one domain D1-1 can include the level-one edge node 116 (identified as EN1-1) that interfaces with the core domain D0. The level-one domain D1-1 can also include level-two edge nodes 114 (identified as EN2-1 and EN2-2) that interface with the level-two domain D2-1 and D2-2, respectively. The level-one domain D1-2 can include a level-one edge node 116 (identified as EN1-2) that interfaces with the core domain D0 and level-two edge nodes 114 (identified as EN2-3 and EN2-3') that interface with the level-two domain D2-3. Even though the level-two edge nodes 114 are shown in FIG. 1 as being a part of the level-one domains D1-1 and D1-2, in other embodiments, the edge nodes 114 can also be a part of corresponding level-two domains D2-1, D2-2, or D2-3.

Even though particular number of edge nodes 114 and 116 are shown between pairs of level-one domains 102 and level-two domains 104 in FIG. 1, in other embodiments, the individual edge nodes 114 and 116 may include a single or a group of network nodes having the same forwarding state (e.g., a destination hop or a network path in the computer network 100). In certain embodiments, packets or other suitable types of messages from a particular host 106 can pass through any one of the network nodes in a node group to reach a desired destination. For example, the edge node EN1-1 in the level-one domain D1-1 can reach any hosts 106 in the level-two domain D2-1 through one of the edge nodes EN2-1 or EN2-1'. In other embodiments, packets from the particular domain may pass through a particular one of the edge nodes 114 or 116 in the edge node group utilizing traffic engineering or other suitable techniques.

As shown in FIG. 1, the level-two domains 104 can individually include a host network node 112 interconnecting multiple hosts 106 to the corresponding edge nodes. For example, the level-two domain D2-1 can include a host network node 112 that interconnects multiple hosts 116 to the level-two edge nodes EN2-1 and EN2-1'. In one embodiment, the host network nodes 112 can individually include a top-of-rack ("TOR") router or switch. In other embodiments, the host network nodes 112 can include a T1 switch, a bridge, a gateway, or other suitable components. In certain embodiments, the hosts 106 in each level-two domains 104 can be generally similar to one another in structure and/or function. In other embodiments, one of the hosts 106 can differ in structure and/or function than other hosts in a particular domain.

In certain embodiments, the individual host network nodes 112, the edge nodes 114 and 116, and the core network node 118 (collectively referred to herein as "network nodes") can be configured to forward packets or other suitable types of messages based on one or more values in a label stack according to the MPLS protocol. The network nodes can each include a forwarding table identifying a next hop or network path corresponding to a particular value in a label stack. Thus, the network nodes can be configured to collectively route communications to/from a higher level or a lower level domain along one or more network paths or tunnels based on a label stack. For example, the host network node 112 can route a packet from a virtual machine executing on the first host 106a in the level-two domain D2-1 to another virtual machine executing on the second host 106b in the same level-two domain via a tunnel 120a based on a label value "2". Similarly, a packet can be routed from a virtual machine executing on the first host 106a in the level-two domain D2-1 to another third host 106c in a different level-two domain D2-2 via a tunnel 120b along the host network node 112, one of the level-two edge nodes EN2-1 or EN2-1', the level-one edge node EN1-1, to one of the level-two edge nodes EN2-2 or EN2-2' based on a first label value of "3". The level-two edge node EN2-2 or EN2-2' and the host network node 112 can then removes or "pops" the first label value and forwards the packet to the third host 106c based on a second label value of "1".

In another example, a packet can be routed from a virtual machine executing on the first host 106a in the level-two domain D2-1 to another fourth host 106d in a different level-one domain D1-2 via a tunnel 120c. The packet can be forwarded from the host network node 112 via the edge nodes EN2-1 or EN2-1', the level-one domain D1-1, one or more of the core network nodes 118, to the level-one domain D1-2 based on a first label value "4". The level-one edge node EN1-2 can then remove the first label value and forward the message to one of the level-two edge nodes EN2-3 or EN2-3' based on a second label value of "2". The one of the level-two edge nodes EN2-3 or EN2-3' can then remove the second label and forward the message to the fourth host 106d via the host network node 112 based on third label value of "1".

In certain embodiments, the tunnels 120a, 120b, and 120c may be pre-established, for example, with a network route pre-computed based on at least one of a source or destination address in the computer network 100 according to, e.g., MPLS protocol. In other embodiments, the tunnels 120a, 120b, and 120c may be computed, established, and/or otherwise formed on an ad hoc basis or in other suitable manners. Even though particular numbers of labels in label stacks are described above, in other embodiments, each of the label stacks can include other suitable number of labels. In further embodiments, at least one of the network nodes can replace one of the labels in a label stack associated with an incoming packet. In yet further embodiments, at least one of the network node can forward a packet based on an IP address instead of a label or label stack.

As described above, routing packets or other suitable types of messages following the hierarchy in FIG. 1 can significantly reduce numbers of states or routes maintained in each network node based on labels. For example, the host network node 112 in the level-two domain D2-1 can simply forward messages destined to external hosts 106 not in the level-two domain D2-1 to the edge nodes EN2-1 or EN2-1' using an associated label value without maintaining states or routes for any of the external hosts 106 in, for example, the level-two domain D2-2 or D2-3. However, edge nodes 114 or 116 may still need to maintain a substantial amount of state information to allow mapping from an IP address to one or more label values. For instance, the edge node EN2-1 may maintain state or address information on reaching all the hosts 106 in the second level-two domain D2-2. As such, resources in the edge nodes EN2-1 may be insufficient as the number of hosts 106 in the second level-two domain D2-2 increase to millions or tens of millions.

Several embodiments of the disclosed technology can reduce the amount of states or routes maintained at the edge nodes 114 and 116 by implementing discovery and imposition of network routes at hosts 106 instead of storing such data at edge nodes 114 and 116. As shown in FIG. 1, the computing network 100 can also include a label server 126 configured to provide label values, quality of service values, and/or other suitable routing information to the individual hosts 106 in the computing network 100. Based on the routing information received from the label server 126, each of the hosts 106 can construct and impose a label stack on packets or other suitable types of messages to other hosts 106 or an external destination, as discussed in more detail below with reference to FIG. 2. Even though the label server 126 is shown as a group of servers independent from the level-one domains D1-1 and D1-2 and level-two domains D2-1, D2-2, and D2-3. In other embodiments, the label server 126 can include distributed servers (not shown) in one or more of the level-one and/or level-two domains D1-1, D1-2, D2-1, D2-2, and D2-3.

Figure 2:
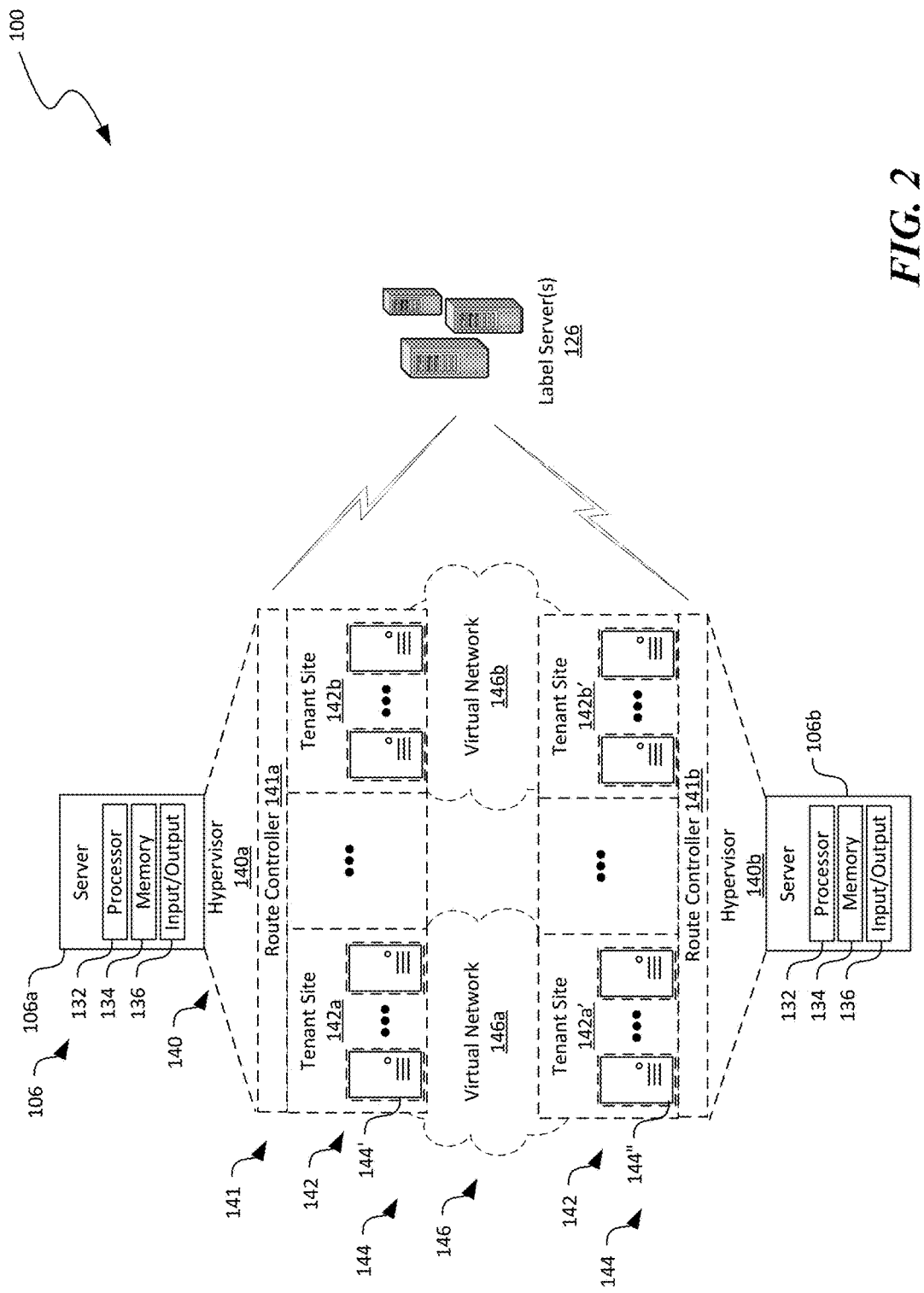
FIG. 2 is a schematic diagram illustrating certain hardware/software components of the computing network of FIG. 1 in accordance with embodiments of the disclosed technology.

FIG. 2 is a schematic diagram illustrating an overlay network implemented on the underlay network of FIG. 1 in accordance with embodiments of the disclosed technology. In FIG. 2, only certain components of the underlay network of FIG. 1 are shown for clarity. As shown in FIG. 2, the first host 106a and the second hosts 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 4-7). The input/output component 136 can include a display, a touch screen, a keyboard, a mouse, a printer, and/or other suitable types of input/output devices configured to accept input from and provide output to an operator and/or an automated software controller (not shown).

The first and second hosts 106a and 106b can individually contain instructions in the memory 134 that when executed by the processors 132, cause the individual processors 132 to provide a hypervisor 140 (identified individually as first and second hypervisors 140a and 140b) and a route controller 141 (identified individually as first and second route controllers 141a and 141b). Even though the hypervisor 140 and the route controller 141 are shown as separate components, in other embodiments, the route controller 141 can be a part of the hypervisor 140 or an operating system (not shown) executing on the corresponding host 106.

The hypervisors 140 can individually be configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can be firmware and/or hardware components. The tenant sites 142 can each include multiple virtual machines 144 for a particular tenant (not shown). For example, the first host 106a and the second host 106b can both host the tenant site 142a and 142a' for a first tenant. The first host 106a and the second host 106b can both host the tenant site 142b and 142b' for a second tenant. Each virtual machine 144 can be executing a corresponding operating system, middleware, and/or applications.

Also shown in FIG. 2, the computing network 100 can include an overlay network having one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

The route controller 141 can be configured to transmit a request to the label server 126 for routing information for transmitting one or more packets from a source virtual machine 144 (e.g., the first virtual machine 144') to a destination virtual machine 144 (e.g., the second virtual machine 144") via the computing network 100. The route controller 141 can then construct and impose a label stack on the packets based on route information received from the label server 126, as described in more detail below with reference to FIG. 3.

Figure 3:
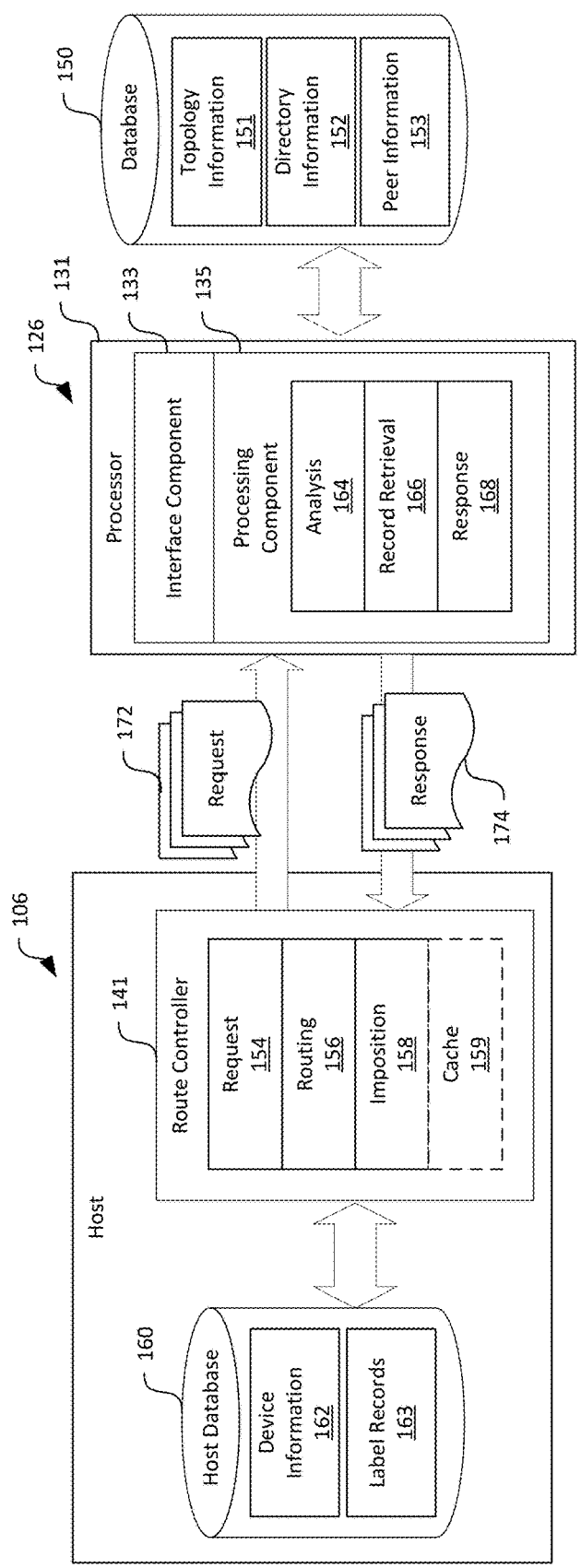
FIG. 3 is a block diagram illustrating hardware/software components of an label server suitable for the computing network of FIG. 1 in accordance with embodiments of the disclosed technology.

FIG. 3 is a block diagram illustrating certain hardware/software components of a route controller and a label server suitable for the computing network 100 of FIGS. 1 and 2 in accordance with embodiments of the disclosed technology. In FIG. 3 and in other Figures herein, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the host 106 (e.g., the first or second host 106a or 106b of FIG. 2) can include the route controller 141 operatively coupled to a host database 160 containing records of device information 162 and label records 163. In certain embodiments, the device information 162 can contain data regarding a location of the host 106. For example, the device information 162 can include identification data of a level-one domain, a level-two domain, a server identification, and/or other suitable location information of the host 106. In other embodiments, the device information 162 can also include data regarding desired communications characteristics. For example, the device information 162 can include data identifying a desired quality of service value, latency, hop count, or other suitable communications characteristics.

The label records 163 can include records of cached routing information (e.g., label stacks) associated with a particular hosts 106 in the computing network 100 (FIG. 1). For example, a label stack corresponding to the fourth host 106d (FIG. 1) can include a label stack of "4-2-1". In another example, a label stack corresponding to the third host 106c can include a label stack of "3-1". The cached label records 163 can have an associated time-to-live value (e.g., 120 seconds) after expiration of which a particular label record 163 can be purged. In other embodiments, the cached label records 163 can be purged manually by an administrator, periodically by the label server 126, or in other suitable manners.

As shown in FIG. 3, the label server 126 can include a processor 131 operatively coupled to a database 150 containing records of topology information 151, directory information 152, and peer information 153. The topology information 151 can include a location identifier for each of the hosts 106 in the computing network 100. For example, in one embodiment, the first host 106a (FIG. 1) can be identified as a first server in the first level-two domain D2-1 (e.g., a rack, FIG. 1) that is in the first level-one domain D1-1 (e.g., a datacenter, FIG. 1). In another embodiment, the first host 106a can be identified by an offset from a reference location in the first level-two domain D2-1 that is in the first level-one domain D1-1. In further embodiments, the individual hosts 106 and network nodes can be identified in other suitable manners.

The directory information 152 can include a central depository of host location information corresponding to each of the virtual machines 144 (FIG. 2) on a particular virtual network 146 (FIG. 2) or tenant site 142 (FIG. 2). For example, a record of the directory information 152 can identify the first virtual machine 144' as residing on the first host 106a. Another record of the directory information 152 can identify the second virtual machine 144" as residing on the second host 106b. Records of the directory information 152 can be organized in an array, table, or other suitable data structures.

Records of the directory information 152 can also be maintained, updated, and/or otherwise managed by an administrator, the label server 126, a directory manager (not shown), or other suitable entities. For example, in one embodiment, the first virtual machine 144' may be relocated from the first host 106a to the second host 106b. In response to such relocation, an administrator can update a corresponding record of the directory information in the database 150 to indicate that the first virtual machine 144' is now located on the second host 106b instead of the first host 106a. In other embodiments, the record may be updated automatically by the label server 126 or other suitable components in suitable manners.

The peer information 153 can include peer address or routing information for traffic that exits the computing network 100 (FIG. 1). For example, in one embodiment, the peer information 153 can identify a peer network, a peer network edge node, and/or a peer device that corresponds to a particular edge node 114 or 116 (FIG. 1) using particular label values, as described in more detail below with reference to FIG. 10. In other embodiments, the peer information 153 can also identify any one of the peer network, peer network edge node, or peer device using other suitable identification techniques.

The processor 131 of the label server 126 can include a microprocessor, a field-programmable gate array, and/or other suitable logic devices. In certain embodiments, the database 150 can include volatile and/or nonvolatile media (e.g., ROM; RAM, magnetic disk storage media; optical storage media; flash memory devices, and/or other suitable storage media) and/or other types of computer-readable storage media. In other embodiments, the database 150 can include cloud-based storage. In the illustrated embodiment, the processor 131 and the database 150 are separate from each other. In other embodiments, the database 150 can be integrated into the label server 126. In further embodiments, the processor 131 and the database 150 can have other suitable arrangements. As shown in FIG. 3, the label server 126 can include an interface component 133 and a processing component 135 operatively coupled to each other. Operations and functions of these components are described below in more detail in connection with operations and functions of the route controller 141. In further embodiments, the label server 126 may also include additional and/or different hardware/software components.

As shown in FIG. 3, the route controller 141 can include a request component 154, a routing component 156, and an imposition component 158 operatively coupled to one another. In other embodiments, the route controller 141 can also include input/output components and/or other suitable types of components. The request component 154 can be configured to transmit a request 172 to the interface component 133 of the label server 126. In certain embodiments, the request 172 can include a network address (e.g., IP address) of the destination virtual machine 144 (FIG. 2), a virtual network identification (e.g., VNET ID) associated with the network address, and a source identification (e.g., level-one and/or level-two domain name or identification) of a source host 106, for example, as follows:

[192-168-101-70].[VNET 1].[D1-1]

where "192-168-101-70" is an example IP address of the destination virtual machine 144; "VNET 1" is an identification of the associated virtual network 146; and "D1-1" identifies the level-one domain to which the source host 106 belongs. In other examples, the request 172 can include additional and/or different information in any suitable format.

In response to receiving the request 172, the interface component 172 of the label server 126 is configured to forward the request 172 to the processing component 135 for further analysis. As shown in FIG. 3, the processing components 135 can include an analysis module 164, a record retrieval module 166, and a response module 168. The analysis module 164, facilitated by the record retrieval module 166, is configured to analyze the received request 172 to determine at least one of the following:

An address or identification of a destination host 106 that is hosting the destination virtual machine 144 corresponding to the network address and virtual network identification associated with the network address;

Identification of domains (e.g., level-one or level-two domains 102 and 104) corresponding to the destination host 106;

An address of one or more network nodes corresponding to the identified domains;

One or more network routes between the source and destination hosts 106 based on the topology information 151; and Route information (e.g., label values) associated with the one or more network routes for reaching the one or more network nodes and associated communications characteristics (e.g., quality-of-service values).

The record retrieval module 166 can be configured to retrieve various records of topology information 151, directory information 152, and peer information 153 to facilitate the analysis performed by the analysis module 164. For example, the record retrieval module 166 can retrieve a record of directory information corresponding to the network address and virtual network identification associated with the network address. The record retrieval module 166 can also retrieve records of the topology information based on the identification of the destination host 106.

The response module 168 is configured to generate a response 174 containing the routing information (e.g., label values) associated with one or more network routes for reaching the destination host 106. In one example, the response 174 can be encoded as text records that include a version, a network prefix, one or more domain identifiers, and one or more label stack values, as follows:

{"v":"hsr1", "p":<network>/<length>, "s":[{"q":<qos>, "d":<level-one domain id>,<label>, "r":<level-two domain id>,<label>, "h":<host id>, <label>} ... ]} where "v" indicates a version having a value "hsr1"; "p" indicates a prefix for a network identified by, for example, an IP address and length; "s" indicates a set of label descriptors each having a "q" indicating a quality of service value, "d" indicating a level-one domain ID, "r" indicating a level-two domain ID, "h" indicating a host ID and their corresponding label values. In other embodiments, the response 174 can be encoded in other suitable formats and contain other suitable types of information. One example data structure for the response 174 is described in more detail below with reference to FIG. 8.

The request component 154 can be configured to receive the response 174 and forward the received response 174 to the routing component 156 for further processing. Based on the received response 174 and the device information 162 in the host database 160, the routing component 156 of the route controller 141 can construct label stacks for communicating with the destination virtual machine 144. For example, in one embodiment, if the response 174 does not include any label stack values, the routing component 156 can impose no label stack on a packet to the destination virtual machine 144. Instead, the packet would be transmitted based on a default mechanism, e.g., via IP routing. In another embodiment, the routing component 156 can also impose a default label stack on the packet. The default label stack can be used to direct the packet to a designated network node (e.g., the level-one edge node EN1-1 in FIG. 1) that containing IP routing information.

If the response 174 does contain label stack values, the routing component 156 can generate label stacks of different lengths based on locations of the source and destination hosts 106. In one embodiment, if the source and destination hosts 106 are in the same level-two domain 104 (FIG. 1), the routing component 156 can generate a label stack with a single value, for example, the label stack for the first channel 120*a* in FIG. 1. In another embodiment, if the source and destination hosts 106 are in the same level-one domain 102 but different level-two domain 104, the routing component 156 can generate a label stack with two label values, for example, the label stack for the second channel 120*b*. In yet another embodiment, if the source and destination hosts 106 are in different level-one domains 102, the routing component 156 can generate a label stack with three label values, for example, the label stack for the third channel 120*c*. In any of the foregoing embodiments, if multiple network routes are available, the routing component 156 can select one of the network routes based on a target quality of service value or other suitable criteria.

The imposition component 158 can be configured to impose the generated label stack on packets destined to the destination virtual machine 144. In one embodiment, the imposition component 158 can append the generated label stack as a preamble to the packets, as shown in FIG. 1. In other embodiments, the imposition component 158 can impose the generated label stack as a suffix or in other suitable manners. In certain embodiments, the route controller 141 can also include an optional cache component 159 (shown in phantom lines for clarity) configured to cache the imposed label stack in the host database 160 as label records 163. In other embodiments, the cache component 159 may be omitted. Operations of the various components and modules shown in FIG. 3 are described in more detail below with reference to FIGS. 4-7.

Even though the routing component 156 is shown in FIG. 3 as a part of the route controller 141, in other embodiments, the routing component 156 may be a part of the processing component 135 of the label server 126. For example, the routing component 156 can receive analysis results and routing information from the analysis module 164 and construct the label stack based thereon. Subsequently, the response module 168 can transmit the constructed label stack to the route controller 141 as the response 174. In further embodiments, another host 106 (FIG. 1) of the computing network 100 or other suitable servers (not shown) may contain the routing component 156 and be configured to construct the label stack based on the routing information from the label server 126.

Figure 4:
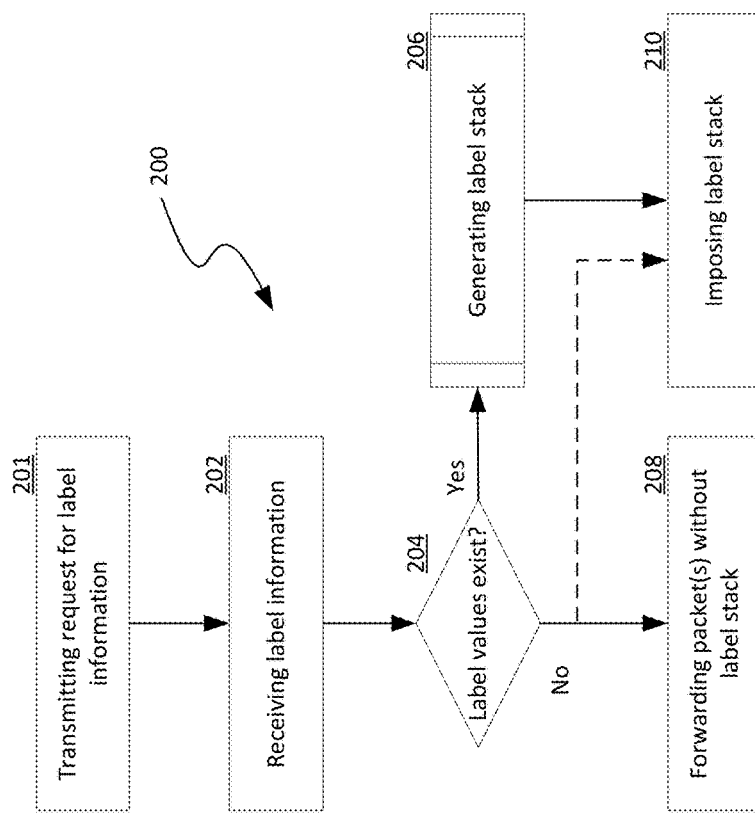
FIG. 4 is a flowchart illustrating a process of discovering network routes in accordance with embodiments of the disclosed technology.

FIG. 4 is a flowchart illustrating a process 200 of discovering network routes by, for example, the route controller 141 of FIG. 3, in accordance with embodiments of the disclosed technology. Even though the process 200 and other processes herein are described with respect to the computing network 100 and the software components or modules of FIGS. 1-3, in other embodiments, the processes may be implemented in and/or with other suitable computing networks, systems, and/or devices.

As shown in FIG. 4, the process 200 includes transmitting a request 172 (FIG. 3) with, for example, the request component 154 of FIG. 3 at stage 201. The request 172 is related to transmitting one or more packets or other suitable types of messages from a source virtual machine 144 (FIG. 2) on a source host 106 (FIG. 2) to a destination virtual machine 144 on a destination host 106. The process 200 can then include receiving label information, for example, contained in the response 174 of FIG. 3, in response to the request 172 at stage 202.

The process 200 can include a decision stage 204 to determine if the received response 174 contains any label values, for example, by utilizing the routing component 156. In response to determining that label values do not exist, in certain embodiments, the process 200 includes forwarding one or more packets or other suitable types of messages without a label stack at stage 208. Optionally, in other embodiments, the process 200 can include imposing a default label stack at stage 210. The default label stack can route the packets to a network node containing information to route the packets according to IP addresses or other suitable routing mechanisms. In response to determining that label values do exist at stage 204, the process 200 includes generating a label stack based on the received label values at stage 206. Several embodiments of generating the label stack are described in more detail below with reference to FIG. 5. The process 200 can then include imposing the generated label stack on the one or more packets at stage 210.

Figure 5:
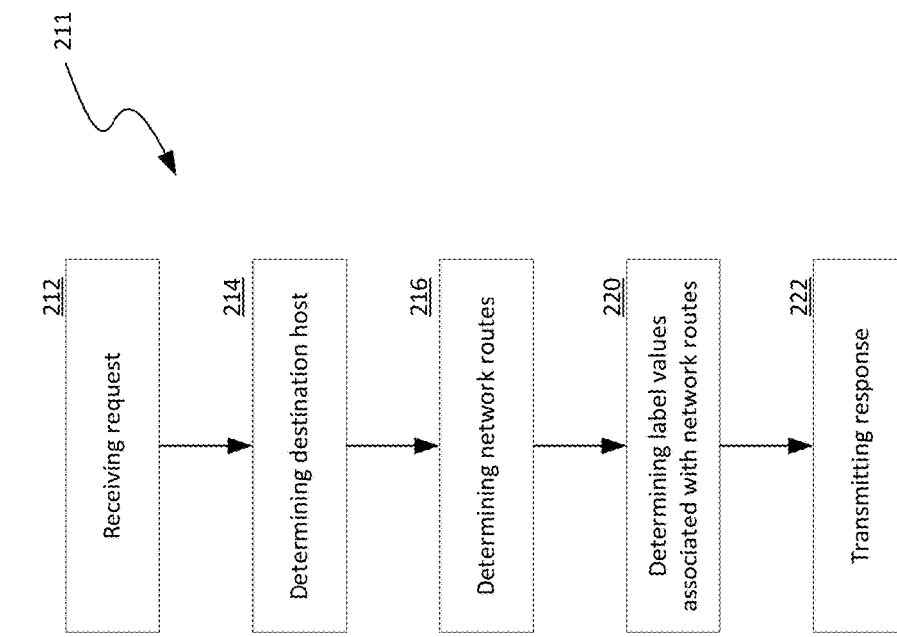
FIG. 5 is a flowchart illustrating a process of responding to a request for routing information in accordance with embodiments of the disclosed technology.

FIG. 5 is a flowchart illustrating a process 211 of responding to a request for routing information by, for example, the label server 126 of FIG. 3, in accordance with embodiments of the disclosed technology. As shown in FIG. 5, the process 211 can include receiving a request, for example with the interface component 133 of FIG. 3, at stage 212. The process 211 can also include determining a destination host 106 (FIG. 1) at stage 214. In one embodiment, determining the destination host 106 can include retrieving a record of directory information 152 (FIG. 3) from the database 150 (FIG. 3) based on an IP address of a destination virtual machine and an associated virtual network identification. In other embodiments, determining the destination host 106 can also include determining a topology profile of the destination host 106 based on, for example, the topology information 151 (FIG. 3) in the database 150. The topology profile can include, for example, identification of a level-one domain, a level-two domain, or other suitable domains to which the destination host 106 belongs.

The process 211 can also include determining network routes at stage 216. In one embodiment, determining network routes can include identifying one or more network nodes through which one or more packets can reach the destination virtual machine from the source virtual machine. In other embodiments, determining network routes can also include identifying one or more channels through which one or more packets can reach the destination virtual machine from the source virtual machine. In certain embodiments, the network routes may be associated with different quality of service values or other suitable types of communications characteristics. In other embodiments, the network routes may be associated with the same quality of service values.

The process 211 can then include determining label values associated with the determined network routes at stage 220. In certain embodiments, the label values can be organized as pairs of parameters referred to as label descriptors. A label descriptor can include a first parameter associated with an identification for a domain, a network node, or an identification of a host 106. A label descriptor can also include a second parameter associated with a label value corresponding to a determined network route. One example label descriptor can be (D1-1, 4) in which "4" is a label value corresponds to a network route to the first level-one domain D1-1 (FIG. 1). The process 211 can then include transmitting a response 174 (FIG. 3) containing the determined label values at stage 222.

Figure 6:
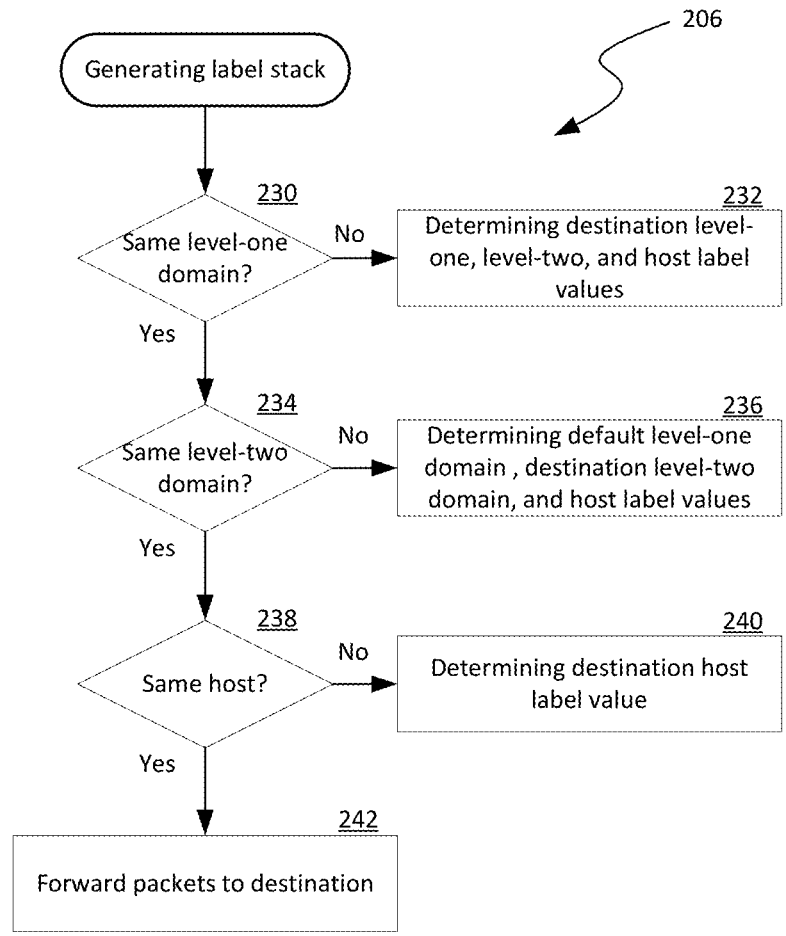
FIG. 6 is a flowchart illustrating a process of constructing a label stack in accordance with embodiments of the disclosed technology.

FIG. 6 is a flowchart illustrating a process 206 of constructing a label stack, by for example, the routing component 156 of the route controller 141 of FIG. 3, in accordance with embodiments of the disclosed technology. As shown in FIG. 6, the process 206 can include a decision stage 230 to determine if a source virtual machine 144 (FIG. 2) and a destination virtual machine 144 are located in the same level-one domain. In response to determining that the source and destination virtual machines 144 are not located in the same level-one domain, the process 206 includes determining a label stack that includes label values for a destination level-one domain, a destination level-two domain, and a destination host, at stage 232.

In response to determining that the source and destination virtual machines 144 are located in the same level-one domain, the process 206 includes another decision stage 234 to determine if the source and destination virtual machines 144 are located in the same level-two domain. In response to determining that the source and destination virtual machines 144 are not located in the same level-two domain, the process 206 includes determining a label stack that includes label values for each of a default level-one domain, a destination level-two domain, and a destination host, at stage 236. The default level-one domain label value can be associated with, for example, the edge node EN1-1 (FIG. 1) of the level-one domain D1-1.

In response to determining that the source and destination virtual machines 144 are located in the same level-two domain, the process 206 includes another decision stage 234 to determine if the source and destination virtual machines 144 are located in the same host. In response to determining that the source and destination virtual machines 144 are not located in the same host, the process 206 includes determining a label stack that includes a label value for a destination host, at stage 240. In response to determining that the source and destination virtual machines 144 are located in the same host, the process 206 includes forwarding one or more packets directly to the destination virtual machine at stage 242.

Figure 7:
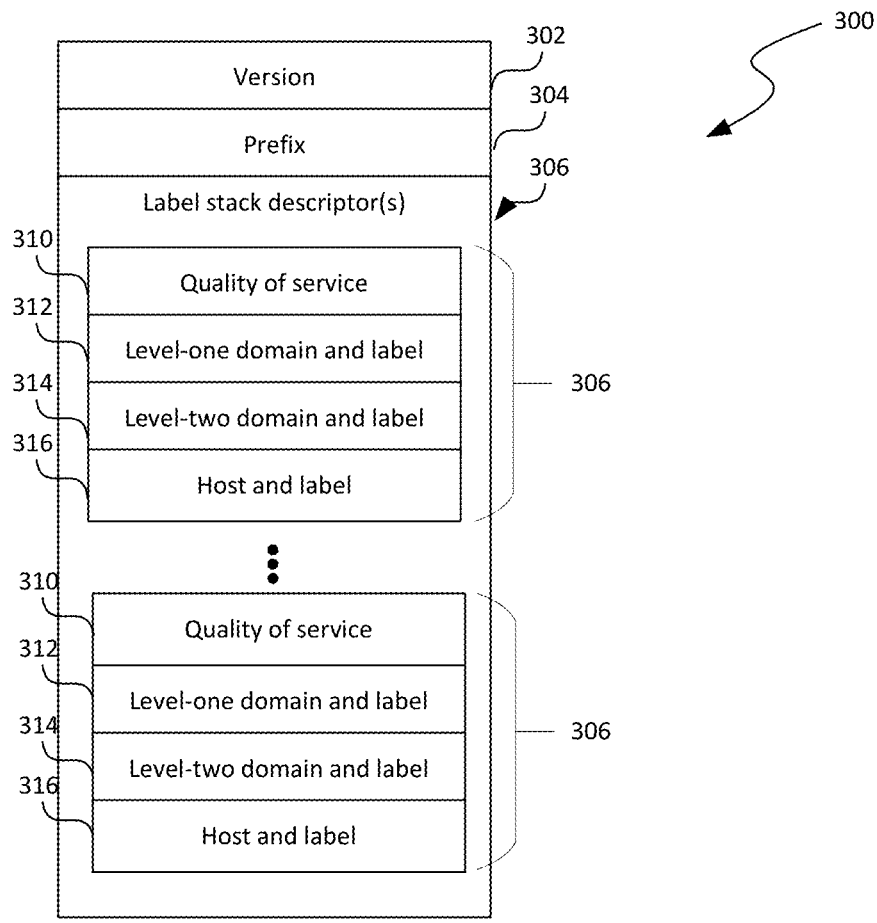
FIG. 7 is a schematic diagram illustrating an example response to request for label values in accordance with embodiments of the disclosed technology.

FIG. 7 is a schematic diagram illustrating an example response 300 to request for label values in accordance with embodiments of the disclosed technology. As shown in FIG. 7, the response 300 can include a version field 302, a prefix field 304, and one or more label stack descriptors 306. The version field 302 can be configured to contain a version identifier (e.g., "hsr1") that identifies a format of the response 300. The prefix field 304 can be configured to contain an identification of a network/length format. For instance, prefix field 304 can contain "192.168.0.0/16" to indicate the label stack descriptors 306 are for network nodes with an address from "192.168.0.0" to "192.168.255.255". If subnets within the foregoing range require different label values, then the prefix may be appended with, for example, an asterisk to indicate accordingly.

As shown in FIG. 7, each of the label stack descriptors 306 can include a quality of service field 310, a level-one domain and label field 312, a level-two domain and label field 314, and a host an label field 316. The quality of service field 310 can be configured to contain a quality of service value. The level-one domain and label field 312, level-two domain and label field 314, and host an label field 316 can each include a label descriptor described above with reference to FIG. 5.

Figure 8:
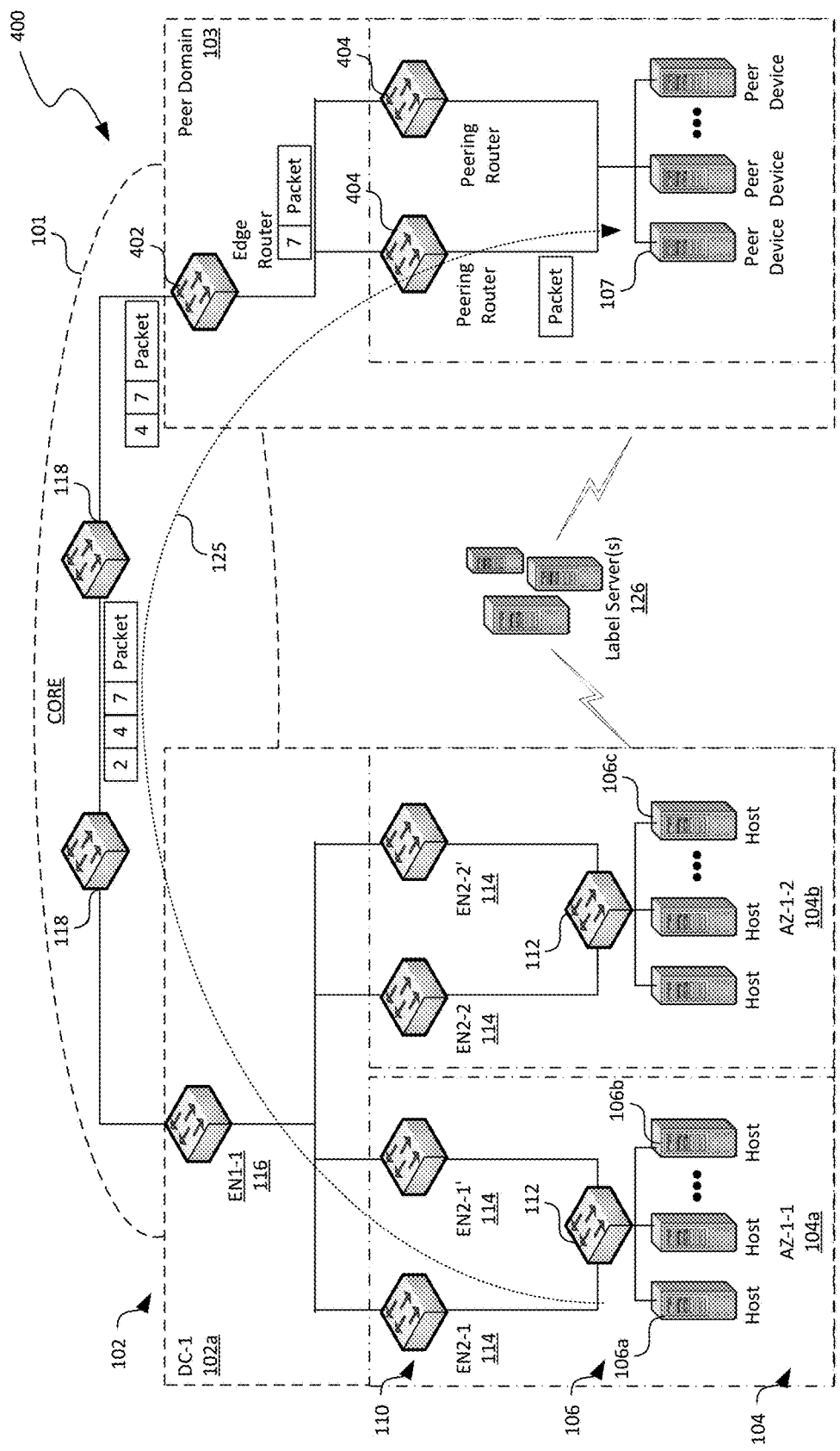
FIG. 8 is a schematic diagram illustrating another computing framework in accordance with embodiments of the disclosed technology.

FIG. 8 is a schematic diagram illustrating another computing network 400 in accordance with embodiments of the disclosed technology. The computing network 400 can be generally similar in structure and function as the computing network 100 in FIG. 1 except the computing network 400 includes a peer domain 103 instead of the second level-one domain D1-2 of FIG. 1. However, components of the computing network 400 can also implement source imposition of label stacks as described above with reference to FIGS. 1-7. For example, the first host 106a can construct and impose a label stack having first, second, and third label values. A first value "2" corresponds to the peer domain 103. Before entering the peer domain 103, the core network node 118 can remove the first label value and forward the packet with the second and third label values to the edge router 402. The edge router 402 can then remove the second label value "4" and forward the packet with the third label value to one of the peering routers 404. The peering router 404 can then remove the third label value "7" and forward the packet to a peer device 107.

Figure 9:
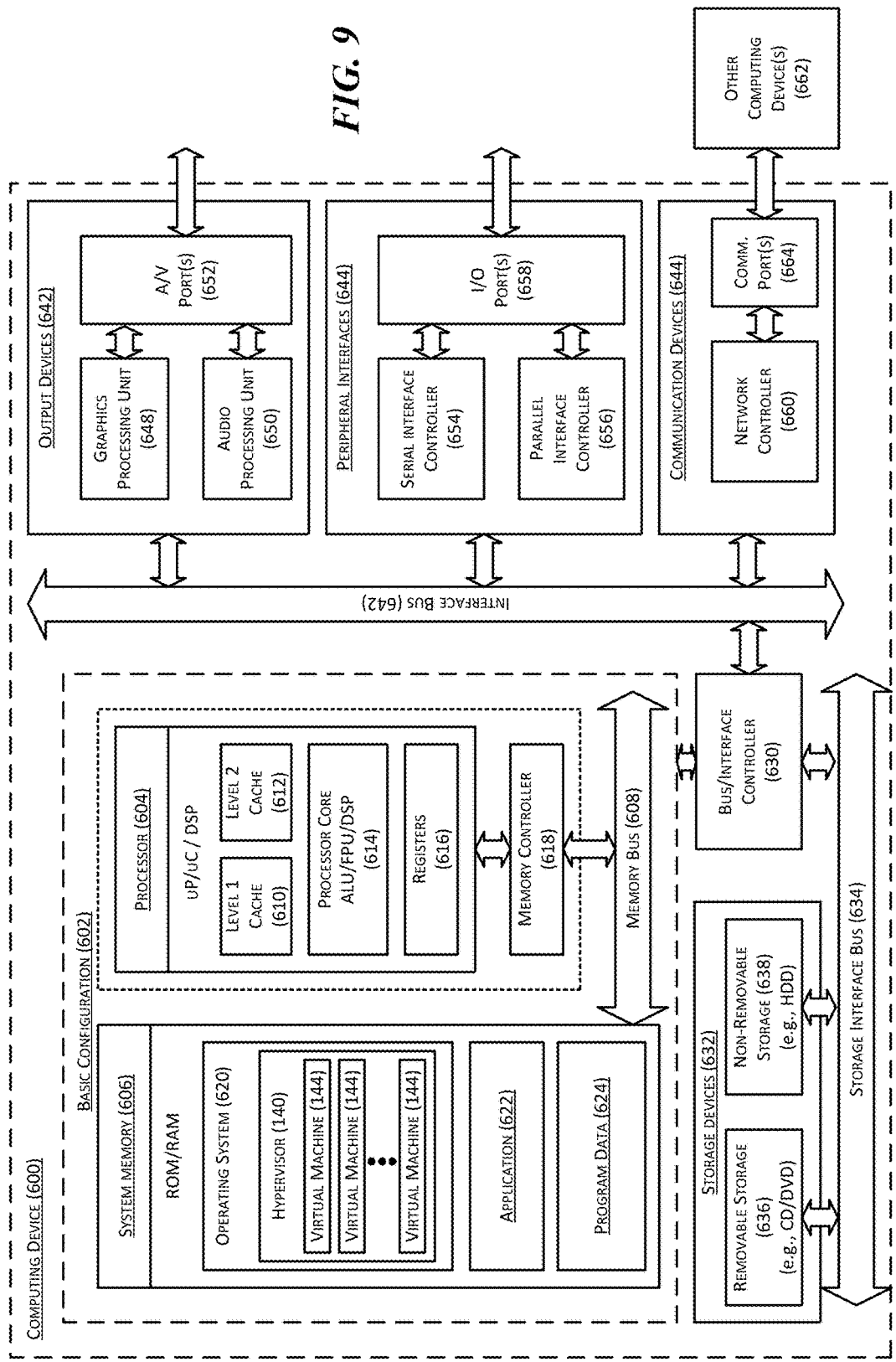
FIG. 9 is a computing device suitable for certain components of the computing network in FIG. 1.

FIG. 9 is a computing device 600 suitable for certain components of the computing network 100 in FIG. 1. For example, the computing device 600 can be suitable for the hosts 102 or the label server 126 of FIG. 1. In a very basic configuration 602, computing device 600 typically includes one or more processors 604 and a system memory 606. A memory bus 608 can be used for communicating between processor 604 and system memory 606.

Depending on the desired configuration, the processor 604 can be of any type including but not limited to a microprocessor (µP), a microcontroller (µC), a digital signal processor (DSP), or any combination thereof. The processor 604 can include one more levels of caching, such as a level-one cache 610 and a level-two cache 612, a processor core 614, and registers 616. An example processor core 614 can include an arithmetic logic unit (ALU), a floating point unit (FPU), a digital signal processing core (DSP Core), or any combination thereof. An example memory controller 618 can also be used with processor 604, or in some implementations memory controller 618 can be an internal part of processor 604.

Depending on the desired configuration, the system memory 606 can be of any type including but not limited to volatile memory (such as RAM), non-volatile memory (such as ROM, flash memory, etc.) or any combination thereof. The system memory 606 can include an operating system 620, one or more applications 622, and program data 624. As shown in FIG. 12, the operating system 620 can include a hypervisor 140 for managing one or more virtual machines 144. This described basic configuration 602 is illustrated in FIG. 9 by those components within the inner dashed line.

The computing device 600 can have additional features or functionality, and additional interfaces to facilitate communications between basic configuration 602 and any other devices and interfaces. For example, a bus/interface controller 630 can be used to facilitate communications between the basic configuration 602 and one or more data storage devices 632 via a storage interface bus 634. The data storage devices 632 can be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 606, removable storage devices 636, and non-removable storage devices 638 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 600. Any such computer readable storage media can be a part of computing device 600. The term "computer readable storage medium" excludes propagated signals and communication media.

The computing device 600 can also include an interface bus 640 for facilitating communication from various interface devices (e.g., output devices 642, peripheral interfaces 644, and communication devices 646) to the basic configuration 602 via bus/interface controller 630. Example output devices 642 include a graphics processing unit 648 and an audio processing unit 650, which can be configured to communicate to various external devices such as a display or speakers via one or more A/V ports 652. Example peripheral interfaces 644 include a serial interface controller 654 or a parallel interface controller 656, which can be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which can be arranged to facilitate communications with one or more other computing devices 662 over a network communication link via one or more communication ports 664.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 600 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 600 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method performed by a source computing device in a computing network, the method comprising:
   constructing, at the source computing device, a label stack to reach a destination virtual machine hosted on a destination computing device interconnected to the source computing device in the computing network based on:
      a set of label values corresponding to the destination computing device, the label values in the set individually corresponding to a network route to the destination computing device in the computing network; and
      a location of the source computing device in the computing network relative to the destination computing device;
   imposing, at the source computing device, the constructed label stack on a packet destined to the destination virtual machine on the destination computing device; and
   transmitting, from the source computing device, the packet with the imposed label stack to the destination virtual machine via the computing network.

2. The method of claim 1, further comprising:
transmitting, from the source computing device, a request to a label server, the request including a network address of the destination virtual machine, a virtual network identification corresponding to the network address, and a location of the source computing device; and
receiving the set of label values, at the source computing device, in response to transmitting the request to the label server.

3. The method of claim 1 wherein:
the computing network includes an underlay network organized as multiple domains in a hierarchy;
the method further includes transmitting, from the source computing device, a request to a label server, the request including a network address of the destination virtual machine, a virtual network identification corresponding to the network address, and a domain to which the source computing device belongs; and
receiving the set of label values in response to transmitting the request to the label server.

4. The method of claim 1, further comprising:
transmitting, from the source computing device, a request to a label server, the request including a network address of the destination virtual machine, a virtual network identification corresponding to the network address, and a location of the source computing device; and
receiving the set of label values, at the source computing device, in response to transmitting the request to the label server, the individual label values corresponding with a network route having an associated quality of service value.

5. The method of claim 1 wherein:
the computing network includes an underlay network organized as multiple domains in a hierarchy; and
constructing the label stack includes:
    determining whether the destination computing device and the source computing device are in one domain; and
    in response to determining that the destination computing device and the source computing device are in the same domain, constructing a label stack having a single label value corresponding to a network route from the source computing device to the destination computing device.

6. The method of claim 1 wherein:
the computing network includes an underlay network organized as multiple domains in a hierarchy; and
constructing the label stack includes:
    determining whether the destination computing device and the source computing device are in same domain; and
    in response to determining that the destination computing device and the source computing device are not in the same domain, constructing a label stack having a first label value corresponding to a first network route from the source computing device to an upper-level domain and a second label value corresponding to a second network route from the upper-level domain to the destination computing device.

7. A method performed by a source computing device in a computing network having an underlay network and an overlay network implemented on the underlay network, the method comprising:
when transmitting a packet from the source computing device to a destination virtual machine hosted on a destination computing device in the computing network,
    constructing, at the source computing device, a label stack to reach the destination virtual machine based on (i) a label descriptor corresponding to the destination computing device and (ii) a location of the destination computing device relative to the source computing device in the underlay network, the label descriptor contains a label value corresponding to a network route in the underlay network to reach the destination computing device;
    imposing, at the source computing device, the constructed label stack on the packet destined to the destination virtual machine hosted on the destination computing device; and
    transmitting, from the source computing device, the packet with the imposed label stack to the destination virtual machine via the computing network.

8. The method of claim 7 wherein:
the underlay network is organized as multiple domains in a hierarchy; and
the method further includes transmitting a request to a label server, the request containing data representing a network address of the destination virtual machine, a virtual network identification to which the network address belongs, and an identification of a domain in the underlay network to which the source computing device belongs.

9. The method of claim 7 wherein:
the underlay network is organized as multiple domains in a hierarchy and the overlay network including a virtual network; and
the method further includes transmitting a request to a label server, the request containing data representing a virtual network address of the destination virtual machine, a virtual network identification to which the virtual network address belongs, and an identification of a domain in the underlay network to which the source computing device belongs.

10. The method of claim 7 wherein:
the label descriptor includes a set of label descriptors each being associated with a quality of service value; and
constructing the label stack includes constructing, at the source computing device, the label stack by selecting one of the label descriptors associated with a quality of service value that corresponds to a target quality of service value.

11. The method of claim 7 wherein:
the underlay network is organized as multiple domains in a hierarchy; and
constructing, at the source computing device, the label stack includes:
    determining whether the source computing device and the destination computing device are in a single domain in the underlay network; and
    in response to determining that the destination computing device and the destination computing device are in a single domain in the underlay network, constructing a label stack having a single label value corresponding to a network route from the source computing device to the destination computing device via one or more network nodes in the single domain of the underlay network.

12. The method of claim 7 wherein:
the underlay network is organized as multiple domains in a hierarchy; and
constructing, at the source computing device, the label stack includes:
  determining whether the destination computing device and the destination computing device are in a single domain in the underlay network; and
  in response to determining that the destination computing device and the destination computing device are not in a single domain in the underlay network, constructing the label stack having a first label value corresponding to a first network path from the source computing device to an upper-level domain in the underlay network and a second label value corresponding to a second network path from the upper-level domain to the destination computing device.

13. The method of claim 7, further comprising:
transmitting a request to a label server and in response, receiving the labor descriptor from the label server, wherein the label descriptor includes a text record containing a version, a network prefix, one or more domain identifiers in the underlay network, and one or more label values.

14. A source computing device in a computing network having an underlay network and an overlay network implemented on the underlay network, the source computing device comprising:
a processor and a memory operatively coupled to the processor, the memory containing instructions executable by the processor to cause the source computing device to:
  construct, at the source computing device, a label stack to reach a destination virtual machine based on a label descriptor corresponding to a destination computing device hosting the destination virtual machine, the label descriptor containing one or more label values corresponding to a network route in the underlay network to reach the destination computing device;
  impose, at the source computing device, the constructed label stack on a packet destined to the destination virtual machine; and
  transmit, from the source computing device, the packet with the imposed label stack to the destination virtual machine via the computing network.

15. The source computing device of claim 14 wherein:
the underlay network is organized as multiple domains in a hierarchy; and
the memory contains additional instructions executable by the processor to cause the source computing device to transmit a request to a label server for the label descriptor, the request containing data representing a network address of the destination virtual machine, a virtual network identification to which the network address belongs, and an identification of a domain in the underlay network to which the source computing device belongs.

16. The method of claim 14 wherein:
the underlay network is organized as multiple domains in a hierarchy and the overlay network including a virtual network; and
the memory contains additional instructions executable by the processor to cause the source computing device to transmit a request to a label server, the request containing data representing a virtual network address of the destination virtual machine, a virtual network identification to which the virtual network address belongs, and an identification of a domain in the underlay network to which the source computing device belongs.

17. The source computing device of claim 14 wherein:
the label descriptor includes a set of label descriptors each being associated with a quality of service value; and
to construct the label stack includes to construct, at the source computing device, the label stack by selecting one of the label descriptors associated with a quality of service value that corresponds to a target quality of service value.

18. The source computing device of claim 14 wherein:
the underlay network is organized as multiple domains in a hierarchy; and
to construct, at the source computing device, the label stack includes to:
  determine whether the source computing device and the destination computing device are in a single domain in the underlay network according to the identifications of the source and destination computing devices; and
  in response to determining that the destination computing device and the destination computing device are in a single domain in the underlay network, construct a label stack having a single label value corresponding to a network route from the source computing device to the destination computing device via one or more network nodes in the single domain of the underlay network.

19. The source computing device of claim 14 wherein:
the underlay network is organized as multiple domains in a hierarchy; and
to construct, at the source computing device, the label stack includes to:
  determine whether the destination computing device and the destination computing device are in a single domain in the underlay network according to the identifications of the source and destination computing devices; and
  in response to determining that the destination computing device and the destination computing device are not in a single domain in the underlay network, construct the label stack having a first label value corresponding to a first network path from the source computing device to an upper-level domain in the underlay network and a second label value corresponding to a second network path from the upper-level domain to the destination computing device.

20. The source computing device of claim 14 wherein the memory contains additional instructions executable by the processor to cause the processor to cache the imposed label stack corresponding to the destination virtual machine in a database of the source computing device.

* * * * *